US008395125B1

(12) United States Patent
Prescher et al.

(10) Patent No.: US 8,395,125 B1
(45) Date of Patent: Mar. 12, 2013

(54) SILICON PHOTOMULTIPLIER TRIGGER NETWORK

(71) Applicants: Gordian Prescher, Cologne (DE); Thomas Frach, Aachen (DE); Andreas Thon, Aachen (DE)

(72) Inventors: Gordian Prescher, Cologne (DE); Thomas Frach, Aachen (DE); Andreas Thon, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 13/646,888

(22) Filed: Oct. 8, 2012

Related U.S. Application Data

(62) Division of application No. 12/672,074, filed as application No. PCT/IB2008/053164 on Aug. 6, 2008, now Pat. No. 8,319,186.

(60) Provisional application No. 60/954,623, filed on Aug. 8, 2007.

(51) Int. Cl.
*G01T 1/24* (2006.01)
(52) U.S. Cl. .................................. 250/370.01
(58) Field of Classification Search .............. 250/370.01
See application file for complete search history.

(56) References Cited

U.S. PATENT DOCUMENTS

| 5,668,484 A | 9/1997 | Nomura |
| 6,356,116 B1 | 3/2002 | Oh |
| 7,115,963 B2 | 10/2006 | Augusto et al. |
| 2002/0148957 A1 | 10/2002 | Lingren et al. |
| 2005/0012033 A1 | 1/2005 | Stern et al. |
| 2006/0192086 A1 | 8/2006 | Niclass et al. |
| 2006/0202129 A1 | 9/2006 | Niclass et al. |
| 2006/0231742 A1 | 10/2006 | Forsyth |
| 2007/0126060 A1 | 6/2007 | Lee et al. |
| 2007/0278387 A1 | 12/2007 | Shalom et al. |

FOREIGN PATENT DOCUMENTS

| JP | 2001244446 A | 9/2001 |
| WO | 2004099865 A2 | 11/2004 |
| WO | 2006111869 A2 | 10/2006 |
| WO | 2006111883 A2 | 10/2006 |
| WO | 2006126026 A1 | 11/2006 |
| WO | 2009001237 A1 | 12/2008 |
| WO | 2009019660 A2 | 2/2009 |

OTHER PUBLICATIONS

Cova, et al.; Evolution and Prospect of Single-Photon Avalanche Diodes and Quenching Circuits; 2003; Workshop on Single Photon Detectors presentation, POLIMI—Politecnico de Malano, DEI; 36 pages.
Niclass, et al.; A Single Photon Detector Array with 64×64 Resolution and Millimetric Depth Accuracy for 3D Imaging; 2005; IEEE Solid-State Circuits Conf.; Session 19—Imagers; pp. 364, 365, 604.
McElroy, et al.; Characterization and Readout of MADPET-II Detector Modules: Validation of a Unique Design Concept for High Resolution Small Animal PET; 2005; IEEE Trans. on Nuclear Science; 52(1)199-204.

*Primary Examiner* — David Porta
*Assistant Examiner* — Hugh H Maupin

(57) ABSTRACT

An apparatus includes a plurality of photosensors. Photon trigger signals produced in response to signals from the sensors are received by a trigger line network that includes segment, intermediate), and master lines. The trigger network is configured to reduce a temporal skew introduced by the trigger line network. Validation logic provides a trigger validation output signal.

19 Claims, 8 Drawing Sheets

SILICON PHOTOMULTIPLIER TRIGGER NETWORK

CROSS REFERENCE TO RELATED APPLICATIONS

This application is a divisional of U.S. Ser. No. 12/672,074 filed Feb. 4, 2010 which is a national filing of PCT application Serial No. PCT/IB2008/053164, filed Aug. 6, 2008, published as WO2009/019660 A2 on Feb. 12, 2009, which claims the benefit of U.S. provisional application Ser. No. 60/954,623 filed Aug. 8, 2007, which is incorporated herein by reference.

DESCRIPTION

The following relates to photodiodes, and especially to arrays of Geiger-mode avalanche photodiodes. It finds particular application to detectors used in positron emission tomography (PET) systems, single photon emission computed tomography (SPECT) systems, optical imaging devices, high energy physics, and other applications that measure the arrival times of incoming photons.

Various applications in the medical and other domains rely on the detection of low level light pulses. PET systems, for example, include radiation sensitive detectors disposed about an examination region, typically in a generally annular or ring-shaped arrangement. The detectors, which detect temporally coincident 511 kilo electron volt (keV) gamma photons indicative of positron decays occurring in an examination region, include a scintillator that generates bursts of lower energy photons (typically in or near the visible light range) in response to received 511 keV gammas. Each burst typically includes on the order of several hundreds to thousands of photons spread over a time period on the order of a few tens to hundreds of nanoseconds (ns).

In a time of flight (TOF) PET system, the relative arrival times of the coincident gamma photons are used to estimate the position of a positron decay along a line of response (LOR). For a given activity level and imaging time, the additional TOF data can ordinarily be used to improve the quality of the reconstructed images.

Photomultiplier tubes (PMTs) have conventionally been used to detect the photons produced by the scintillator. However, PMTs are relatively bulky, vacuum tube based devices that are not especially well-suited to applications requiring high spatial resolution. More recently, silicon photomultipliers (SiPMs) have been introduced. SiPMs have included an array of detector pixels arranged in a plurality of rows and columns, with each pixel typically including on the order of several thousand avalanche photodiode (APD) cells. Each APD cell includes a photon trigger circuit that produces trigger output signals in response to photons detected by the cell. The trigger outputs are provided to a time to digital converter (TDC) that generates digital time stamp data indicative of the gamma arrival time.

SiPMs can offer a number of advantages, including relatively compact size, good sensitivity, and good spatial resolution. Moreover, APDs and their associated quenching and recharging, triggering, TDC, photon energy measurement, and other associated circuitry can often be fabricated on the same semiconductor substrate. See PCT publication WO 2006/111883 A2 dated Oct. 26, 2006 and entitled Digital Silicon Photomultiplier for TOF-PET.

As noted above, the trigger signals from the various APD cells have been used to trigger the TDC. A conventional trigger line architecture is illustrated in FIG. 1, it being understood that the APDs, quenching and recharge circuitry, readout logic, and other features of the various cells and the SiPM have been omitted from FIG. 1 for clarity of explanation.

As illustrated, each cell in the array uses an N-type field effect transistor (NFET) 102 to produce a trigger output signal. The NFETs 102 of the cells in each column of the array are connected to a common trigger line (CTL) 104 in a wired-negative-or (wired-NOR) arrangement, and the CTLs of the various columns are directly connected in parallel to a line 106 that runs along the edge of the APD array. The line 106 is in turn connected to the input of an on-chip TDC 108. As, in the example case of a PET system, the accuracy of the position estimate depends on the accuracy of the timestamp data produced by the TDC, it is generally desirable to improve the accuracy and consistency of the triggering and resultant time to digital conversion process.

Moreover, APDs can produce output signals even in the absence of a detected photon. As a consequence, SiPMs have also included validation circuits that suppress trigger signals resulting from dark counts or, stated conversely, accept those trigger signals indicative of detected photons. The validation has been performed in parallel with the time to digital conversion process. According to such an arrangement, the TDC has been triggered in response to an initial photon of a scintillation burst. Following (e.g., on the order of about 5 nanoseconds (ns) after) the triggering of the TDC, the output of the validation circuit has been checked. If the count is believed to be a dark count, the APD array, trigger lines and the TDC have been recharged and reset, respectively. In a variation, the TDC has been triggered if a given number N of photons are detected in a validation time period.

While triggering on an initial photon ordinarily produces a relatively accurate timing measurement, the time needed to complete the validation and/or reset process increases the detector dead time, thus tending to limit the maximum detector count rate. The situation is exacerbated in the case of an APD that is prone to dark counts. While N-photon triggering can reduce the impact of APD dark counts, the timing measurement is typically less accurate.

Aspects of the present application address these matters and others.

In accordance with one aspect, an apparatus includes a semiconductor substrate, a plurality of avalanche photodiodes fabricated on the substrate, a plurality of photon trigger circuits fabricated on the substrate and in operative electrical communication with the avalanche photodiodes so as to produce trigger signals, and trigger lines fabricated on the substrate. The trigger lines are arranged in a hierarchical structure that includes a first level and a second level. The first level includes a first trigger line that receives trigger signals from a plurality of the trigger circuits. The apparatus also includes a first repeater that receives trigger signals from the first trigger line of the first level. The second level includes a first trigger line that receives trigger signals from the first repeater.

According to another aspect, a method includes using an avalanche photodiode of a silicon photomultiplier to detect photons, generating photon trigger signals in response to signals from the avalanche photodiode, receiving the photon trigger signals at a first trigger line, and receiving, via a first repeater of the silicon photomultiplier, trigger signals from the first trigger line at a second trigger line.

According to another aspect, an apparatus includes a semiconductor substrate, a plurality of photosensors fabricated on the substrate, and a first trigger line fabricated on the substrate. The first trigger line receives photon trigger signals produced in response to signals from a first plurality of the photosensors. The apparatus also includes a second trigger line fabricated on the substrate. The second trigger line receives photon trigger signals produced in response to signals from a second plurality of the photosensors. The apparatus also includes at least one of photon trigger validation logic and a time to digital converter fabricated on the substrate and in operative electrical communication with the first and second trigger lines.

According to another aspect, a method of using an apparatus that includes an array of photosensors fabricated on a semiconductor substrate, a first trigger line fabricated on the substrate, and a second trigger line fabricated on the substrate is provided. The first and second trigger lines each receive photon trigger signals generated in response to signals from a different subset of the photosensors, and the method includes receiving a photon trigger signal at the first trigger line and using circuitry fabricated on the substrate to perform at least one of (i) determining if a photon trigger signal was received by the first trigger line, determining if a photon was received by the second trigger line, and using a result of the first and second determination steps to produce a trigger valid signal; and (ii) performing a time to digital conversion as a function of a trigger signal received by a third trigger line of the substrate, where in the third trigger line receives trigger signals from the first and second trigger lines.

According to another aspect, a method includes generating photon trigger signals in response to signals from avalanche photodiodes of an avalanche photodiode array, validating the photon trigger signals according to a validation criterion, changing the validation criterion, and repeating the steps of generating and validating.

According to another aspect, an apparatus includes an avalanche photodiode array including first, second and third array portions. The first and second portions are relatively more prone to crosstalk than the first and third portions. The apparatus also includes a signal validator that validates signals from the array. The signals include valid signals resulting from photons detected by photodiodes of the array and signals resulting from crosstalk. The validator uses signals from the first and third portions to produce a first group validation signal and a signal from the second portion to produce a second group validation signal. The arrangement reduces an effect of crosstalk between the first and second array portions.

Still further aspects of the present invention will be appreciated by those of ordinary skill in the art upon reading and understanding the following detailed description.

The invention may take form in various components and arrangements of components, and in various steps and arrangements of steps. The drawings are only for purposes of illustrating the preferred embodiments and are not to be construed as limiting the invention.

Figure 2:
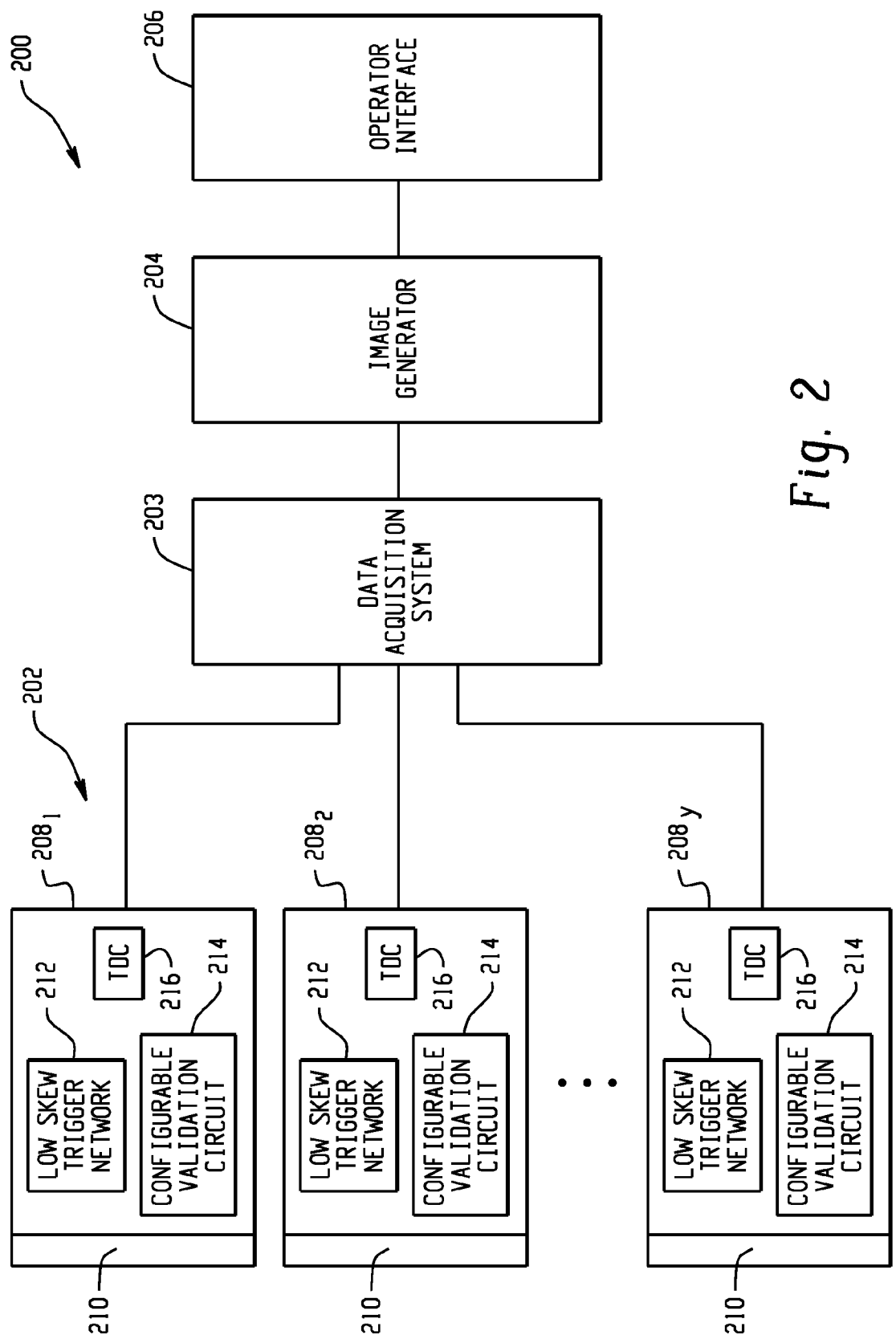
FIG. 2 depicts an imaging system.

With reference to FIG. 2, a example imaging system 200 includes one or more radiation sensitive detectors 202, a data acquisition system 203, an image generator 204, and an operator interface 206.

The radiation sensitive detector 202 includes one or more SiPMs $208_{1-y}$ that produce output data indicative of the energy, arrival times, locations, and/or other characteristics of the radiation received by the detector. Wavelength shifters 210 such as scintillators may be provided to shift the wavelength(s) of the incoming radiation to more closely match the sensitive wavelength(s) or the SiPMs 208, for example in the case of a PET system. As will be described in greater detail below, the SiPMs 208 include a low temporal skew photon trigger network 212, a configurable photon validation circuit 214, and a TDC 216 in operative electrical communication with the trigger network 212 and the validation circuit 214.

Signals from the detectors 202 are received by a data acquisition system 203, which produces data indicative of the detected radiation. Again in the example case of a PET system, the data acquisition system 204 produces projection data indicative of temporally coincident photons received by the various SiPMs. Where the system includes time of flight capabilities, a time of flight determiner uses relative arrival times of coincident 511 KeV gamma received by the various SiPMs 208 so as to produce time of flight data.

An image generator 204 uses the data from the acquisition system 204 to produce image(s) or other data indicative of the detected radiation. Again in the example of a PET system, the image generator 204 includes an iterative or other reconstructor that reconstructs the projection data to form volumetric or image space data.

The user interacts with the system 200 via the operator interface 206, for example to control the operation of the system 200, view or otherwise manipulate the data from the image generator 204, configure the configurable validation circuit 214, or the like.

Returning momentarily to FIG. 1, the spatial distance and hence the length of the line between the various cells and the TDC 108 varies as a function of the position of the cells in the array. According to a distributed resistance-capacitance (RC) model, the propagation delay along a wire line increases quadratically with the line length:

$$t = k \cdot l^2 \qquad \text{Equation 1}$$

where t is the propagation delay, k incorporates the distributed resistance and capacitance, and l is the length of the line.

As a consequence, trigger signals generated by cells at different locations in the array experience different propagation delays. For example, a trigger signal generated by a cell 110 located relatively farther from the TDC 108 will exhibit a longer propagation delay than will a trigger signal generated by a cell 112 located nearer to the TDC 108. The difference in propagation delay time introduces a temporal skew in the measured photon arrival times. The skew, which increases with the size of the array, compromises the accuracy of the photon arrival time measurement.

Figure 3A:
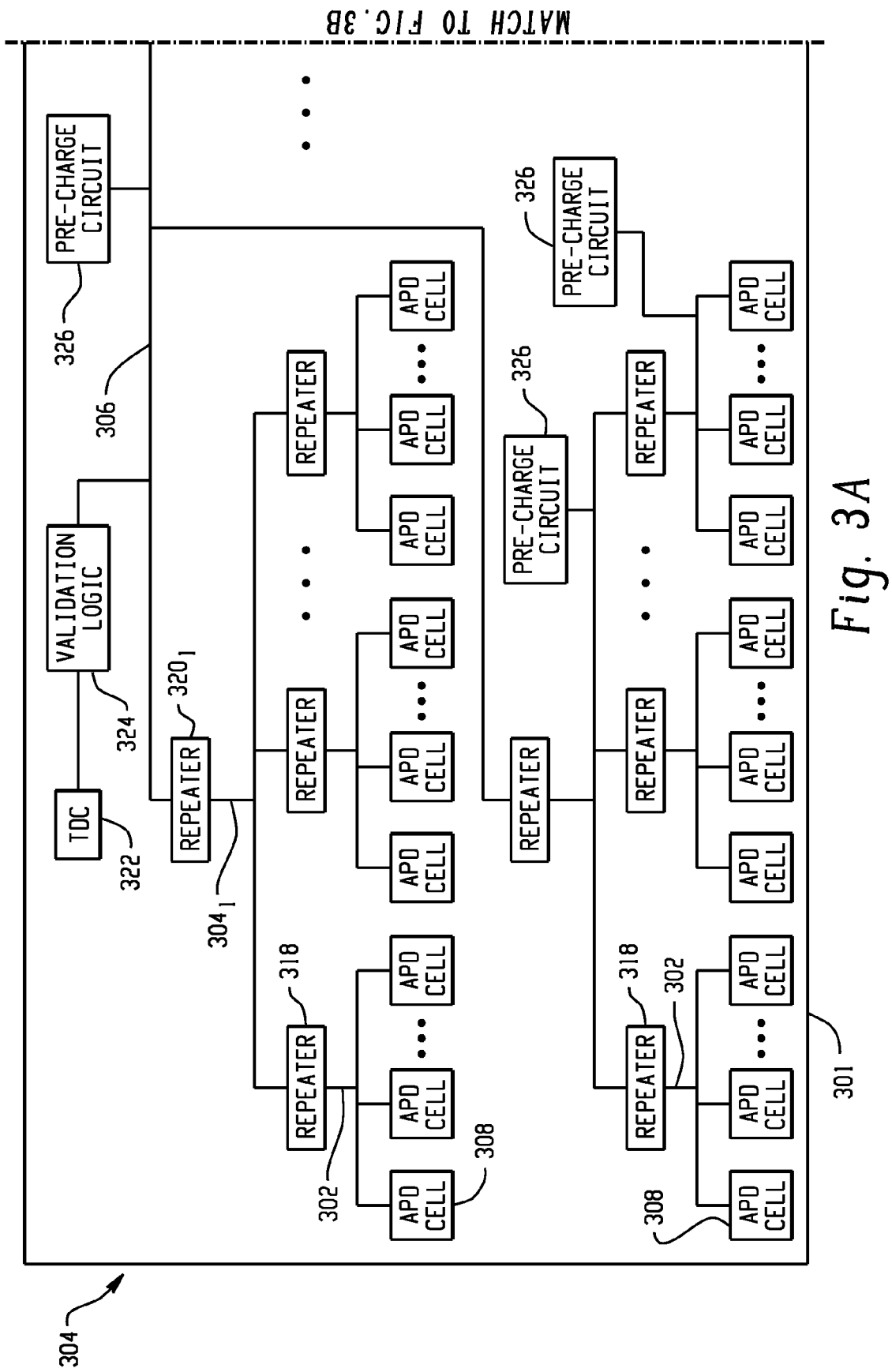
FIG. 3A depicts left portion of hierarchical trigger line architecture.
Figure 3B:
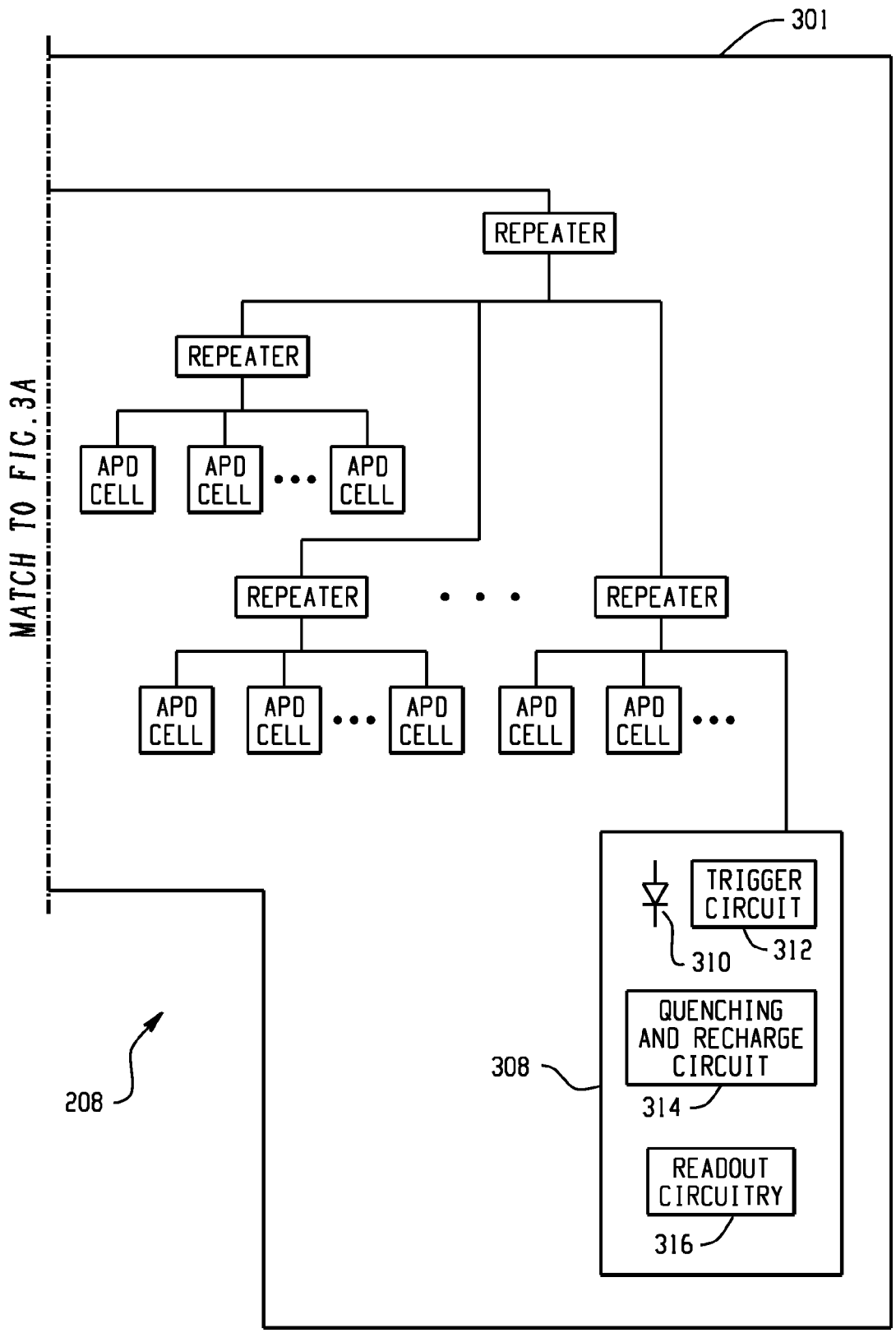
FIG. 3B depicts right portion of hierarchical trigger line architecture.

FIGS. 3A and 3B illustrate a photon trigger network of a typical detector pixel of the SiPM 208, it being understood that the SiPM 208 ordinarily includes a plurality of similarly configured detector pixels. As illustrated, the trigger network includes a hierarchical, tree-structured trigger line architecture in which the trigger lines are organized in three (3) levels: lower level or segment trigger lines (STLs) 302, intermediate trigger lines (ITLs) 304, and higher level or master trigger lines (MTLs) 306.

The SiPM 208, the components of which are fabricated on a semiconductor substrate 301, includes a plurality of APD cells 308. The cells 308, which generate output signals in response to detected photons, include circuitry such as an APD 310 biased in the Geiger mode, readout circuitry 316, quenching and reset circuitry 314, and a photon trigger circuit 312 that includes an NFET or other active semiconductor device that is connected to a segment trigger line 302 in a wired-NOR or other suitable arrangement.

It will be understood by those of ordinary skill in the art that the cells 308 typically include various data and other inputs and outputs, and the SiPM includes various photon counting, energy measurement, and other circuits that have been omitted from FIG. 2 for clarity of explanation. Examples of these and other features of the cells 308 and the SiPM 208 are more fully described in above-noted PCT publication PCT 2006/111883A2 and in U.S. Patent Application Ser. No. 60/945,998, filed on Jun. 25, 2007 and entitled Photodiode Self-Test, which publication and application are expressly incorporated by reference herein in their entireties.

With continuing reference to FIGS. 3A and 3B, segment trigger lines 302 receive trigger signals from one or more APD cells 308. Intermediate trigger lines 304 receive trigger signals from one or more segment trigger lines via repeater(s) 318, and the master trigger line 306 receives trigger signals from one or more intermediate trigger lines 304 via repeater(s) 320. The master trigger line 306 is used to trigger a TDC 322, either directly or through validation or other logic 324, the connection and operation of which will be described in further detail below.

The various trigger lines 302, 304, 306 are connected to suitable pre-charger or pull-up circuits 326 as indicated generally in FIGS. 3A and 3B for an example trigger line at each level of the hierarchy, it being understood that each trigger line of the trigger line network is ordinarily connected to a separate pre-charger or pull up circuit 326. The repeaters 318, 320 preferably include one or more NFETs or other semiconductor switches. In one implementation, the NFETs are configured in an open drain configuration, with their drains connected to a higher level trigger line in a wired-NOR arrangement. Depending on the number and nature of the signals received at their respective inputs, the repeaters 318, 320 may also include inverters or other logic, examples of which will be discussed in greater detail below.

Figure 1:
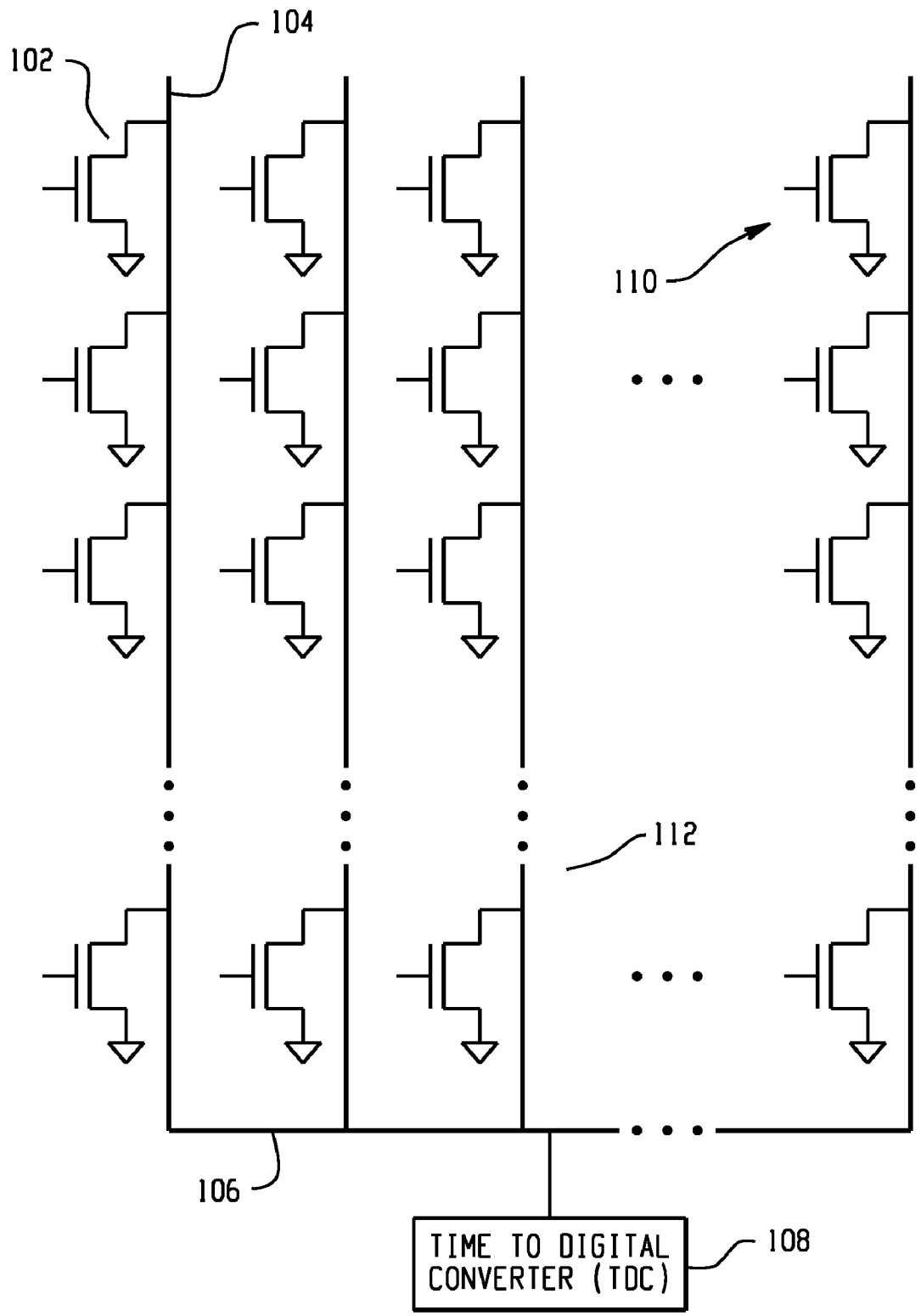
FIG. 1 depicts a prior art trigger line architecture.

For a given cell 308-TDC 322 distance, the insertion of one or more repeaters 318, 320 between a cell 308 and the TDC 322 tends to reduce the length of the individual trigger lines 202, 204, 206 compared to the arrangement of FIG. 1, with the degree of reduction depending on factors such as the number and placement of the repeaters 318, 320, the routing of the various lines 302, 304, 306, their resistance and capacitance, and the like. In addition to reducing the overall propagation delay in the various lines (subject to delays introduced by the repeaters 318, 320), variations in propagation delay may also be reduced, especially when considered in light of the $l^2$ delay dependence posited by the distributed RC model of Equation 1. Moreover, electrically and/or physically symmetrical trigger line 302, 304, 306 arrangements may be used to provide similar propagation delays along trigger lines at one or more levels of the hierarchy.

Figure 4:
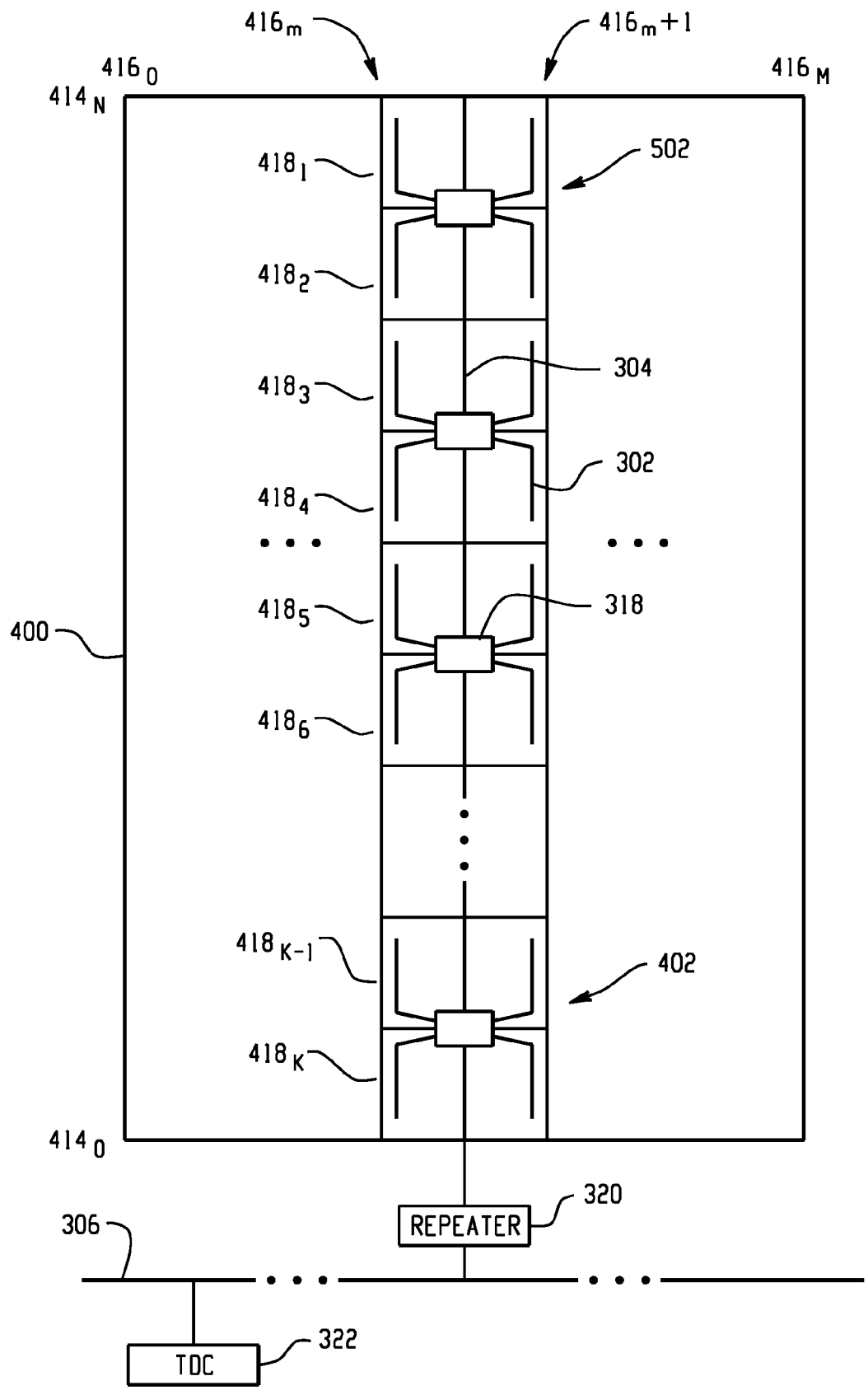
FIG. 4 depicts trigger lines of a silicon photomultiplier.

Turning now to FIG. 4, an example trigger line architecture will be described in relation to an SiPM pixel that includes a plurality of APD cells arranged in array having a boundary or perimeter 400. It is assumed for the purposes of the present example that the cells of the array are arranged generally in N rows $414_{1-N}$ and M columns $416_{1-M}$. While trigger lines 302, 304 are shown for two (2) example columns $416_m$ and $416_{m+1}$ are shown, the trigger lines of the other columns are similarly arranged.

For the purposes of the trigger line arrangement, each column 416 is divided into K segments $418_{1, 2, 3 \ldots K}$, with each segment including a segment trigger line 302. The segment trigger lines 302 are connected via repeaters 318 to an intermediate trigger line 304 that runs between the columns $416_m$, $416_{m+1}$. The intermediate trigger line 304 is in turn connected via a repeater 320 to a master trigger line 306.

As illustrated in FIG. 4, the master trigger line 306 runs outside the perimeter 400 and generally along an edge of the array. Alternatively, the master trigger line 306 may be located at the center of or otherwise between desired rows 414 of the array. Such an arrangement exploits the physical symmetry of the array structure and hence further reduces the variation in propagation delay introduced by the intermediate trigger line 304.

Figure 5:
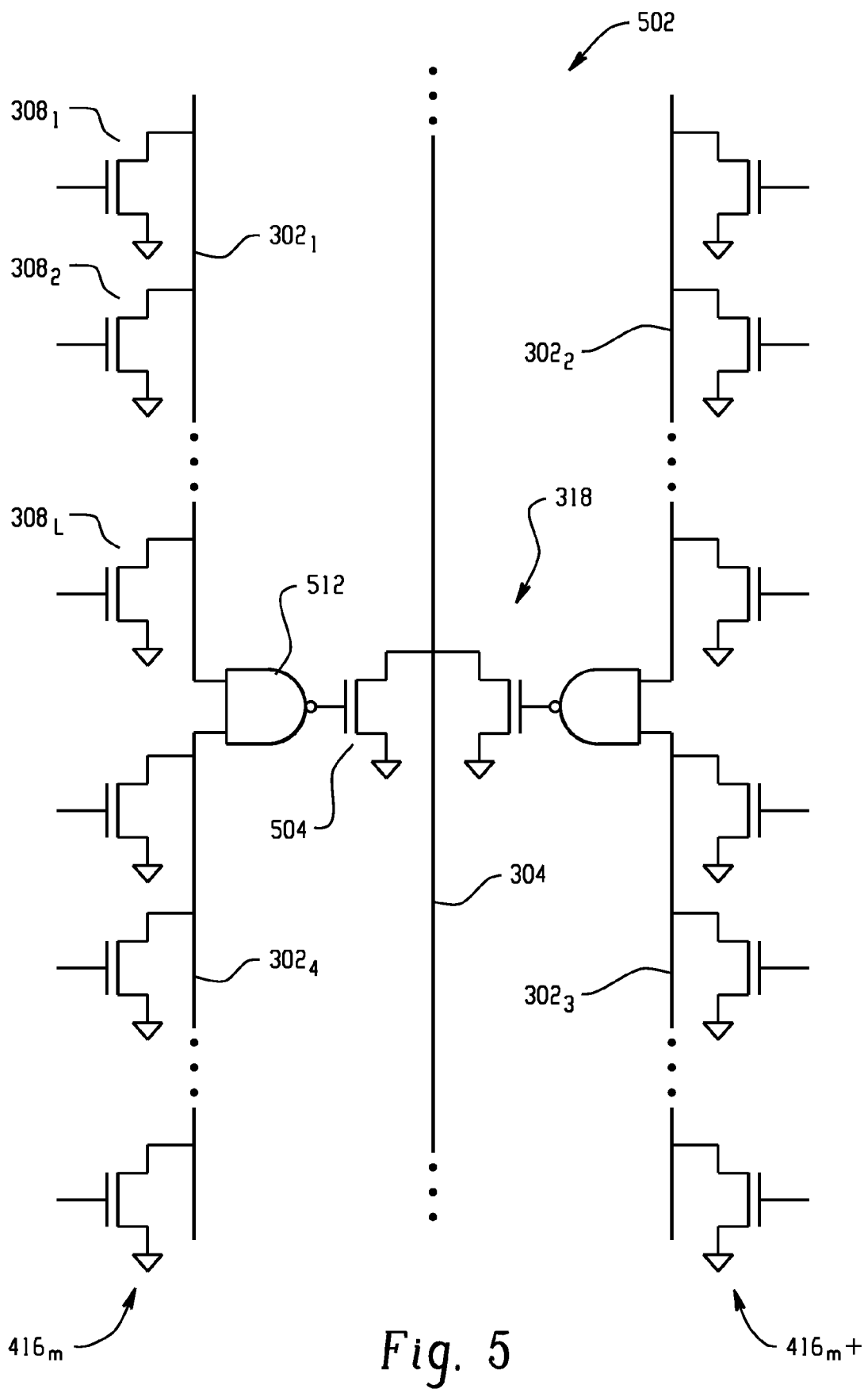
FIG. 5 depicts a butterfly structure.

With additional reference to FIG. 5, segment trigger lines 302 of adjacent columns and segments form substantially spatially symmetric butterfly structures 502. In the illustrated embodiment, each intermediate trigger line 304 is connected to K/2 butterfly structures 502.

As illustrated, a butterfly structure 502 includes four (4) segment trigger lines $302_{1-4}$. The trigger outputs of L=N/K APD cells $308_{1-L}$ are connected to each segment trigger line $302_{1-4}$ in a wired-NOR arrangement via NFETs 504. The segment trigger lines 302 are connected to the inputs of negative and (NAND) gates 512. The NAND gate 512 outputs are in turn connected to the gates of NFETs 504, the drains of which are connected to an intermediate trigger line 304 in a wired-NOR arrangement.

As can be seen, the segment trigger lines $302_{1-4}$ and the connected cells 308 are substantially spatially symmetric with respect to the repeater 318 and the intermediate trigger line 304, and the NFETS 504 are connected to the intermediate trigger line 304 at substantially the same location. As will be appreciated, the propagation delay along the length of the segment trigger lines 302 will be substantially similar; trigger signals generated by cells 308 connected to the butterfly structure 502 will likewise tend to have substantially similar propagation delays when measured by the TDC 322.

Other repeater 318 arrangements are also contemplated. For example, the various segment trigger lines 302 may be connected to a single, four (4) input NAND gate, in which case one of the NFETs 504 may be omitted. In another example, the various segment trigger lines 302 may connected to the intermediate trigger line 304 through one or more NOR gates, in which case the NFET(s) 504 may be omitted. In yet another example, the various segment trigger lines 302 may connected to the intermediate trigger line 304 through separate NFETs 504, with a suitable inverter provided at the input of the NFET 504 to provide the correct logic. Still other combinations of positive and negative logic may also be provided.

Arrangements other than butterfly structures are also contemplated. For example, the segment trigger lines 302 may be connected to the intermediate trigger lines 304 singly or in a pair-wise fashion. In the former case, each segment trigger line 302 may be connected to an intermediate trigger line 304 at a desired location, for example through a dedicated repeater 318. In an example of a pair-wise connection, the first $302_1$ and second $302_2$ segment trigger lines may be connected to the intermediate trigger line 304 at a first location, the third $302_3$ and fourth $302_4$ segment trigger lines may be connected to the intermediate trigger line at a second location, and so on.

Figure 6:
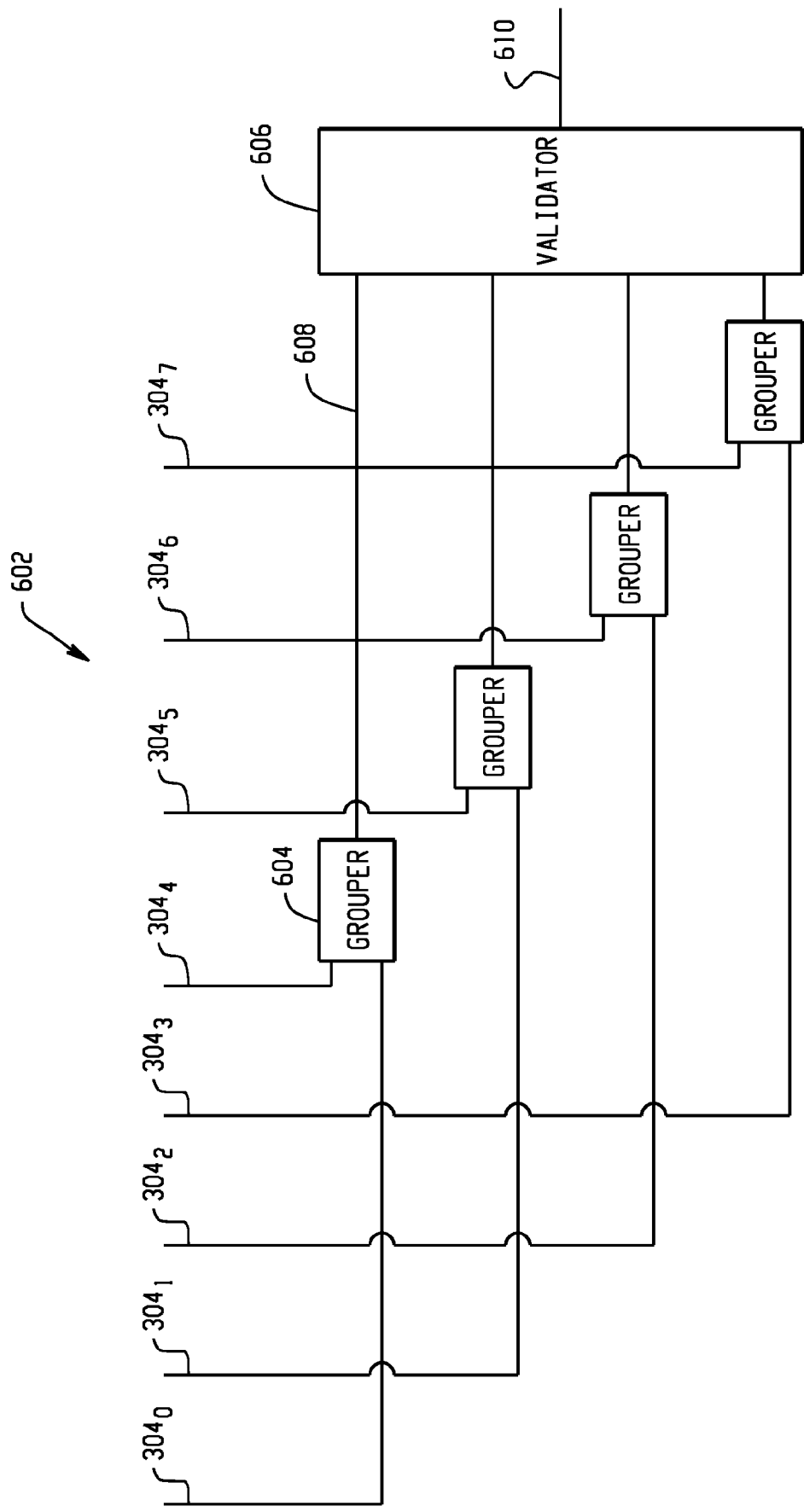
FIG. 6 depicts a validation circuit.

Turning now to FIG. 6, a validation circuit 602 of the validation logic 324 includes a plurality of trigger line groupers 604 and a validator 606. Each grouper 604 receives trigger signals from two or more intermediate trigger lines 304. While FIG. 6 illustrates an example case of circuit 602 that receives signals from eight intermediate trigger lines 304, it will be understood that the validation circuit 602 would ordinarily be configured to accommodate the number of intermediate trigger lines 304 present in a given detector pixel.

Especially where the detector is prone to cross talk, the intermediate trigger lines 304 provided to each grouper 604 advantageously receive trigger signals from non-contiguous regions of the APD array (e.g., from non-adjacent rows, columns, or other areas). Each grouper 604 produces a group trigger signal 608 if trigger signals are received at Q or more of its inputs during a triggering time window (e.g., on the order of about 5 ns in the case of a PET system). The validator 606 receives signals from the various groupers 604 and produces a valid photon trigger signal 610 if group trigger signals are received from R or more groupers 604 within the triggering time window.

Desired values for Q and R may be established based on the number of intermediate trigger lines 302 received at each grouper, the number of groupers 604, and the desired performance characteristics of the pixel and/or the detector. As illustrated in FIG. 6, for example, each grouper 604 receives trigger signals from two intermediate trigger lines 304. According to such an implementation, Q may be set to two, in which case the groupers 604 may be considered as performing a logical and function. Thus, a valid output signal 610 will be produced only if trigger signals are received at both inputs of at least R of the groupers 604. Again to the example of a detector that is prone to cross talk, such an implementation reduces the likelihood that a valid output signal 610 will be produced as the result of such cross talk. Note that the value of R may also be used to impart an energy threshold to the validation, with higher values of R tending to increase the energy threshold.

The pixel may be varied between a first photon triggering mode and an $R^{th}$ photon triggering mode by selectively connecting the TDC 322 trigger input to the master trigger line 306 or the output of the validation circuit 602 in coordination with an operation of the system 200, for example via validation logic 324. Additionally or alternately, the triggering mode may be varied by changing the values of one or both of Q and R during an operation of the SiPM. In one such example, Q may be set to one, in which case the groupers 604 may be considered as performing a logical or function. According to such an implementation, varying the value of Q from two to one will cause the validator 606 to produce a valid output signal 610 if a trigger signal is received at any R of the input trigger lines 304. If R is set to one, the validation circuit 602 produces a valid output signal in response to a first photon detected by the APD array, thus providing a first photon triggering mode. The groupers 604 may also be omitted, in which case a valid output signal 610 will be produced if a trigger signal is received at exactly R intermediate trigger lines 304.

The triggering validation mode may be selected based on a performance characteristic of the SiPM 208, an examination protocol being carried out by the system 200, an input from a human user, a value of a temperature or other environmental parameter, or the like.

In one example, the dark count performance of the SiPMs 208 may vary as a result of variations in the manufacturing process. At the same time, various types of systems 200 may have differing dark count and/or timing requirements. Accordingly, the SiPMs 208 may be graded or otherwise selected for use in a appropriate system 200 type. Thus, SiPMs having cells 308 that are prone to dark counts may be installed in systems 200 having relatively less stringent time measurement requirements, in which case the validation mode would ordinarily be set at an $R^{th}$ photon triggering mode, where R is greater than one.

As another example, a pixel of a given SiPM 208 may include one or more cells 308 that are prone to dark counts. Hence, the validation mode may be varied on a pixel-by-pixel basis based on a measured dark count performance of the pixel. The validation mode may also be varied on a group-by-group basis, for example by disregarding trigger signals from those trigger lines that receive trigger signals from cell(s) 308 that are prone to dark counts. Where the individual cells 308 can be disabled or inhibited, those cells 308 having an unacceptable performance can also be disabled. Hence, if a cell or group of cells 308 in a given pixel exhibit a dark count rate that is greater than a first dark count rate threshold, the validation criteria for the cell or group of cells 308 can be increased. Should the performance of the cell or group of cells 308 exceed a second, relatively higher threshold, the affected cell or cells 308 can be disabled.

In other example, the performance characteristics of the SiPMs 208 may vary with variables such as time and/or temperature. Accordingly, the performance characteristics may be measured or otherwise determined following the installation of the SiPM in a given system 200, with the validation mode adjusted accordingly. Such an operation may be performed, for example, by a service engineer in connection with the installation and commissioning of the system 200 or periodic or other service of the system 200. The validation mode may also be adjusted automatically or semi-automatically following a user-initiated measurement or a confirmation of a proposed adjustment.

In still another example, the performance requirements of the system 200 may vary as function of an examination protocol being performed by the system. For example, a first examination protocol may emphasize count rate over accuracy of the timing measurement, while a second examination protocol may require a relatively low count rate but have a higher timing accuracy requirement. Consequently, the validation mode may be selected based on the determined requirements of the protocol, for example on an SiPM 208 by SiPM 208, pixel-by-pixel, or group-by-group basis.

Figure 7:
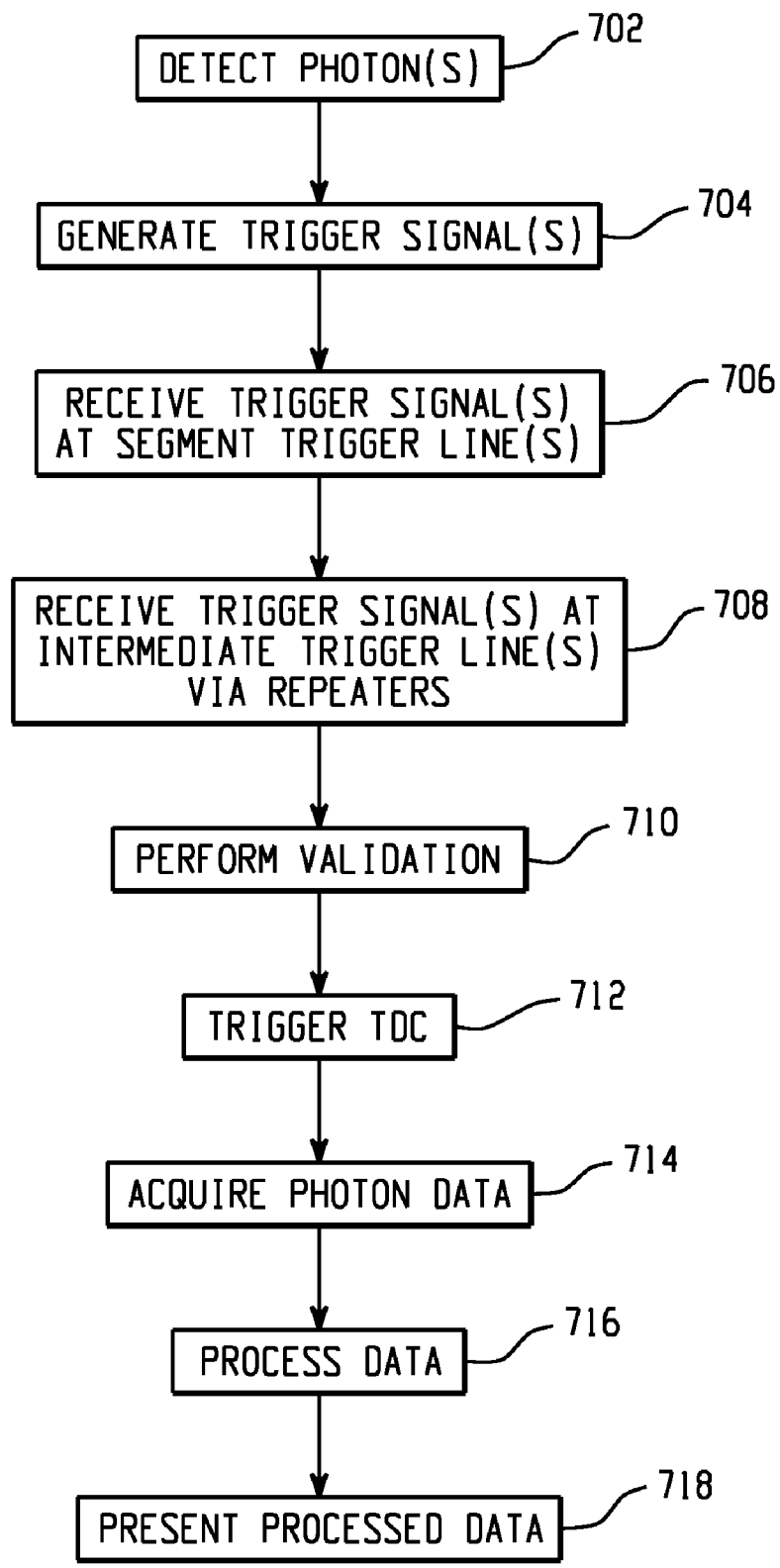
FIG. 7 depicts a method.

Operation will now be described with reference to FIG. 7.

One or more photons are detected at step 702.

Photon trigger signal(s) indicative of the detected photon(s) are generated at step 704.

At 706, photon trigger signal(s) are received at one more segment trigger lines 302.

At 708, photon trigger signal(s) are received at one more intermediate trigger lines 304 via repeater(s) 318.

At 710, photon trigger signal(s) are received at the master trigger line 306 via repeater(s) 320.

Trigger signal validation is performed at 710. Where the SiPMs 208 include a configurable triggering validation circuit, the validation logic is varied according to the selected trigger validation mode.

The TDC is triggered at step 712, and a data acquisition sequence is initiated. Note that the validation 710 may be performed following or otherwise temporally in parallel with the triggering of the TDC.

Data indicative of the detected photon(s) is acquired at step 714. Where the system 200 includes a plurality of SiPMs 208, the photon data is acquired from the various SiPMs and aggregated or processed as desired. In the case of a TOF PET system, for example, data indicative of temporally coincident photons is used to produce projection data, with the relative arrival times being used to estimate the location of a positron annihilation along an LOR.

The acquired data is processed at step 716. In the case of an imaging system, for example, the acquired data may be used to generate image data indicative of the detected radiation.

The processed data is presented in a human perceptible form at step 718.

Variations and alternatives are contemplated. For example, the various trigger lines may be organized in structures having less than or greater than three levels. In such a case, the trigger validation circuit 602 may receive trigger signals from a desired level (or levels) in the hierarchy.

The above discussion has focused on an APD array organized in plurality of rows and columns. The various rows and/or columns may be irregular, for example where one or more cells 308 are offset by a fraction of the APD pitch. Moreover, it will be understood that the various columns need not be vertical and the rows need not be horizontal. Thus, for example, the columns may be horizontal and the rows vertical.

The SiPMs 208 may be used in imaging and non-imaging systems other than PET systems and with photodetectors other than APDs.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method of using an apparatus that includes an array of photosensors fabricated on a semiconductor substrate, a first trigger line fabricated on the substrate, and a second trigger line fabricated on the substrate, wherein the first and second trigger lines each receive photon trigger signals generated in response to signals from a subset of the photosensors, the method comprising:

receiving a photon trigger signal;

using circuitry fabricated on the substrate to perform at least one of:

determining if the photon trigger signal was received by the first trigger line; determining if the photon was received by the second trigger line, and using a result of the first and second determination steps to produce a trigger valid signal; and performing a time to digital conversion as a function of a trigger signal received by a third trigger line of the substrate, wherein the third trigger line receives trigger signals from the first and second trigger lines.

2. The method of claim 1 wherein the first and second trigger lines are connected to the third trigger line in a wired-NOR arrangement.

3. The method of claim 1 wherein the apparatus includes a plurality of trigger lines, wherein each trigger line of the plurality receives photon trigger signals generated in response to signals from a different subset of the photosensors, the method including:

determining if a trigger signal was received by at least $Q_1$ members of a first subset of the plurality of trigger lines, where $Q_1$ is greater than 1;

determining if a trigger signal was received by at least $Q_2$ members of a second subset of the plurality of trigger lines, where $Q_2$ is greater than 1.

4. The method of claim 1 wherein the apparatus includes a plurality of trigger lines, wherein each trigger line of the plurality receives photon trigger signals generated in response to signals from a different subset of the photosensors, the method including:

determining if a trigger signal was received by at least R of the trigger lines, where R is greater than equal to 1.

5. The method of claim 1 wherein the apparatus forms part of an examination apparatus and the method includes:

determining a protocol of an examination to be carried out using the apparatus;

using a result of the determination to vary a logic used to produce the valid trigger signal.

6. The method of claim 1 including:

determining an operating characteristic of a photosensor;

using a result of the determination to vary a logic used to produce the valid trigger signal.

7. A method comprising:

generating photon trigger signals in response to signals from avalanche photodiodes of an avalanche photodiode array;

validating the photon trigger signals according to a validation criterion;

changing the validation criterion; and repeating the steps of generating and validating.

8. The method of claim 7 including determining a performance characteristic of the photodiode array, wherein changing includes changing the validation criterion as a function of the determined performance characteristic.

9. The method of claim 8 wherein determining includes determining a dark count performance of an avalanche photodiode of the array.

10. The method of claim 8 wherein determining includes measuring a characteristic of an operating environment of the array.

11. The method of claim 8 wherein the array includes an avalanche photodiode cell (308) and the method includes varying an operation of the cell as a function of the determined performance characteristic.

12. The method of claim 7 wherein the array includes an avalanche photodiode cell and the method includes:

evaluating a performance characteristic of the cell;

disabling an operation of the cell if the evaluated performance characteristic satisfies a first criterion;

and changing includes changing the validation criterion if the evaluated performance characteristic satisfies a second criterion.

13. The method of claim 7 wherein the array forms part of an examination apparatus and the method includes:

determining an examination protocol to be carried out using the apparatus;

adjusting the validation criterion as a function of the determined protocol.

14. An apparatus comprising:

an avalanche photodiode array including first, second and third array portions, wherein the first and second portions are relatively more prone to crosstalk than the first and third portions; and a signal validator that validates signals from the array, wherein the signals include valid signals resulting from photons detected by photodiodes of the array and signals resulting from crosstalk, wherein the validator uses signals from the first and third portions to produce a first group validation signal and a signal from the second portion to produce a second group validation signal, whereby an effect of crosstalk between the first and second array portions is reduced.

15. The apparatus of claim 14 wherein the signals are photon trigger signals.

16. The apparatus of claim 14 wherein the first and third portions are physically non-contiguous.

17. The apparatus of claim 16 wherein the array includes a plurality of columns and the first, second, and third array portions include respective first, second, and third columns of the array.

18. The apparatus of claim 14 wherein the array includes a fourth array portion that is non-contiguous with the second array portion and the validator uses signals from the second and fourth array portions to produce the second group validation signal.

19. The apparatus of claim 14 wherein the validator uses the first and second group validation signals to produce a valid output signal.

* * * * *